US010798011B2

(12) United States Patent
Vernia et al.

(10) Patent No.: US 10,798,011 B2
(45) Date of Patent: Oct. 6, 2020

(54) METHOD AND SYSTEM FOR DATA STREAM PROCESSING

(71) Applicant: ABB Schweiz AG, Baden (CH)

(72) Inventors: Filippo Vernia, La Spezia (IT); Francesca Mazziotti, Montevarchi (IT); Giovanni Morini, Siena (IT)

(73) Assignee: ABB Schweiz AG, Baden (CH)

( * ) Notice: Subject to any disclaimer, the term of this patent is extended or adjusted under 35 U.S.C. 154(b) by 60 days.

(21) Appl. No.: 16/058,653

(22) Filed: Aug. 8, 2018

(65) Prior Publication Data

US 2019/0068511 A1 Feb. 28, 2019

(30) Foreign Application Priority Data

Aug. 31, 2017 (EP) ..................... 17188881

(51) Int. Cl.
  *G06F 15/16* (2006.01)
  *H04L 12/841* (2013.01)
  *H04L 29/08* (2006.01)
  *G06F 9/50* (2006.01)

(52) U.S. Cl.
  CPC .............. *H04L 47/28* (2013.01); *H04L 67/10* (2013.01); *H04L 67/325* (2013.01); *G06F 9/5027* (2013.01); *H04L 67/12* (2013.01); *H04L 67/322* (2013.01)

(58) Field of Classification Search
  USPC ........................................................ 709/218
  See application file for complete search history.

(56) References Cited

U.S. PATENT DOCUMENTS

| | | | | |
|---|---|---|---|---|
| 5,621,795 A * | 4/1997 | Baker | ..................... | H04L 9/083 380/277 |
| 5,862,517 A * | 1/1999 | Honey | ................... | G06K 9/209 702/85 |
| 6,321,267 B1 * | 11/2001 | Donaldson | .............. | H04L 51/12 370/351 |
| 7,249,175 B1 * | 7/2007 | Donaldson | ........... | G06Q 10/107 709/206 |
| 7,457,872 B2 * | 11/2008 | Aton | ................... | G06F 11/3476 709/224 |
| 7,603,425 B2 * | 10/2009 | DiPlacido | ............... | H04L 51/12 709/206 |
| 7,949,545 B1 * | 5/2011 | Madras | .................. | G06Q 50/24 705/3 |
| 7,991,766 B2 * | 8/2011 | Srinivasan | ........ | G06F 16/24568 707/714 |

(Continued)

FOREIGN PATENT DOCUMENTS

| | | |
|---|---|---|
| CN | 106154921 A | 11/2016 |
| CN | 106156079 A | 11/2016 |

*Primary Examiner* — Alicia Baturay
(74) *Attorney, Agent, or Firm* — Patterson Intellectual Property Law, P.C.; Gary L. Montle

(57) ABSTRACT

A method for processing a flow of data from a plurality of devices (1) is disclosed. The method comprises the following steps:
  receiving a data package (100) from a device (1);
  detecting whether said data package (100) relates to an active device (1) or a non-active device; and:
    if the data package (100) relates to an active device (1), delivering the data to a data processing facility (30); and
    if the data package relates to a non-active device (1), storing the data package in a raw-data archive (14).

17 Claims, 2 Drawing Sheets

(56) References Cited

U.S. PATENT DOCUMENTS

| | | | | |
|---|---|---|---|---|
| 8,019,814 | B2* | 9/2011 | Bou-Ghannam | G06Q 30/02 709/203 |
| 8,161,120 | B2* | 4/2012 | Tan | H04L 12/1822 709/206 |
| 8,825,749 | B2* | 9/2014 | Tully | H04N 21/44245 709/203 |
| 9,001,691 | B2* | 4/2015 | Murray | H04L 67/1095 370/254 |
| 9,075,883 | B2* | 7/2015 | Verkasalo | G06Q 10/06 |
| 9,418,493 | B1* | 8/2016 | Dong | G05B 23/0221 |
| 10,001,759 | B2* | 6/2018 | Gupta | G05B 13/0265 |
| 10,334,426 | B2* | 6/2019 | Pitti | H04W 4/80 |
| 2003/0003861 | A1* | 1/2003 | Kagemoto | H04H 20/103 455/3.01 |
| 2005/0080857 | A1* | 4/2005 | Kirsch | H04L 51/00 709/206 |
| 2005/0091319 | A1* | 4/2005 | Kirsch | H04L 51/12 709/206 |
| 2005/0091320 | A1* | 4/2005 | Kirsch | H04L 51/12 709/206 |
| 2005/0198159 | A1* | 9/2005 | Kirsch | H04L 51/12 709/206 |
| 2009/0030783 | A1* | 1/2009 | Schloo | G06Q 30/0207 705/14.1 |
| 2009/0222541 | A1* | 9/2009 | Monga | H04L 29/12113 709/222 |
| 2009/0300169 | A1* | 12/2009 | Sagar | H04L 43/00 709/224 |
| 2012/0166552 | A1* | 6/2012 | Seligstein | H04L 51/12 709/206 |
| 2013/0067544 | A1* | 3/2013 | Kwark | H04L 67/12 726/4 |
| 2016/0065666 | A1* | 3/2016 | Kim | H04L 67/1051 709/203 |
| 2016/0117594 | A1* | 4/2016 | Perez Ramos | G06N 5/04 706/14 |
| 2016/0162521 | A1* | 6/2016 | Pradhan | G06Q 10/10 707/602 |
| 2017/0109762 | A1* | 4/2017 | Kim | G06Q 30/0201 |
| 2018/0041587 | A1* | 2/2018 | Das | G06F 9/5077 |
| 2018/0337864 | A1* | 11/2018 | Wagstaff | H04L 47/20 |
| 2018/0373419 | A1* | 12/2018 | Chen | H04L 67/22 |
| 2019/0116487 | A1* | 4/2019 | Pitti | H04L 67/12 |
| 2019/0260797 | A1* | 8/2019 | Yun | H04L 63/1425 |
| 2019/0333113 | A1* | 10/2019 | Carlson | G10L 17/005 |
| 2020/0034752 | A1* | 1/2020 | Luo | H04L 51/22 |
| 2020/0050522 | A1* | 2/2020 | Coleman | G06F 11/203 |
| 2020/0252349 | A1* | 8/2020 | Pak | H04L 49/10 |

* cited by examiner

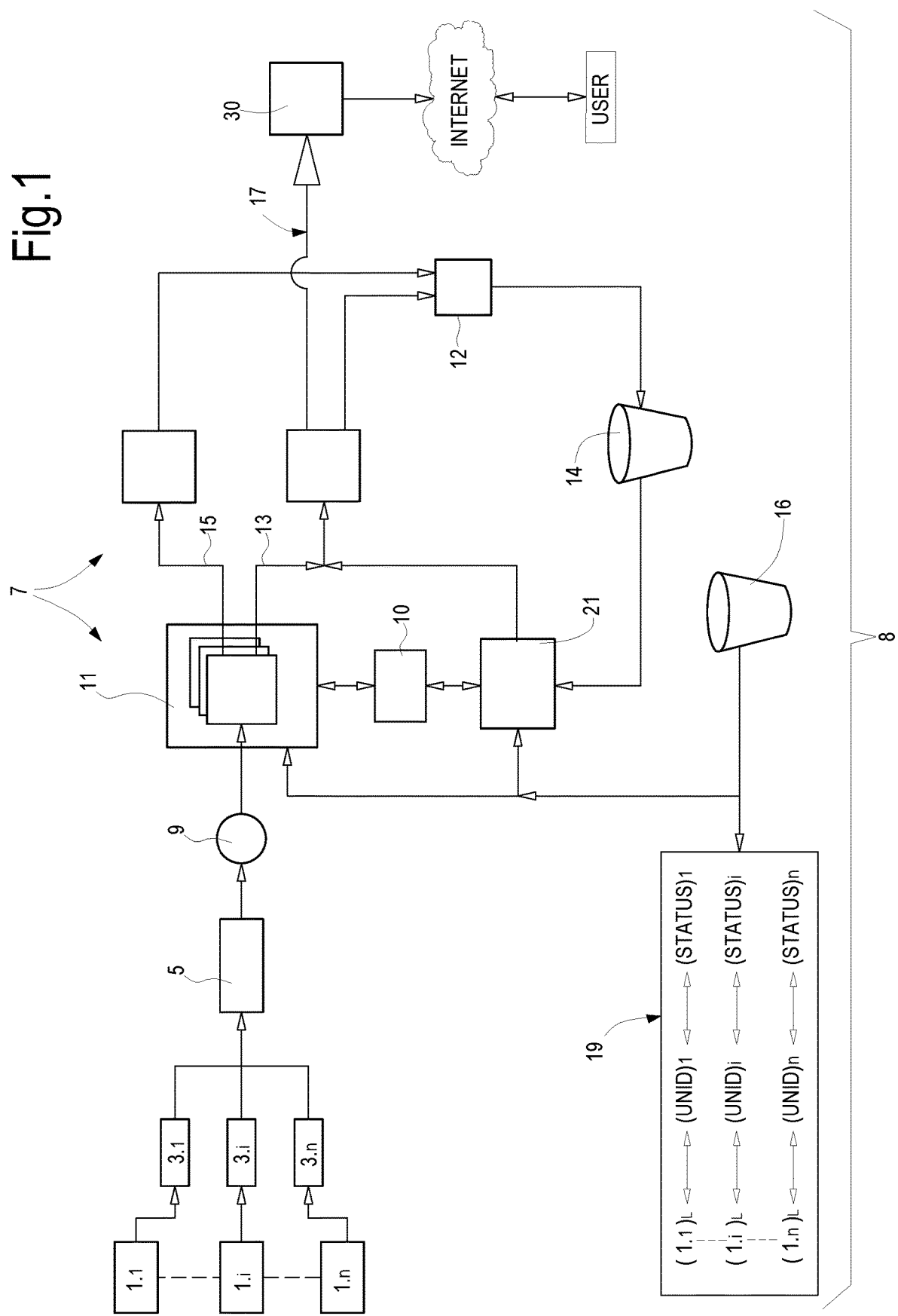

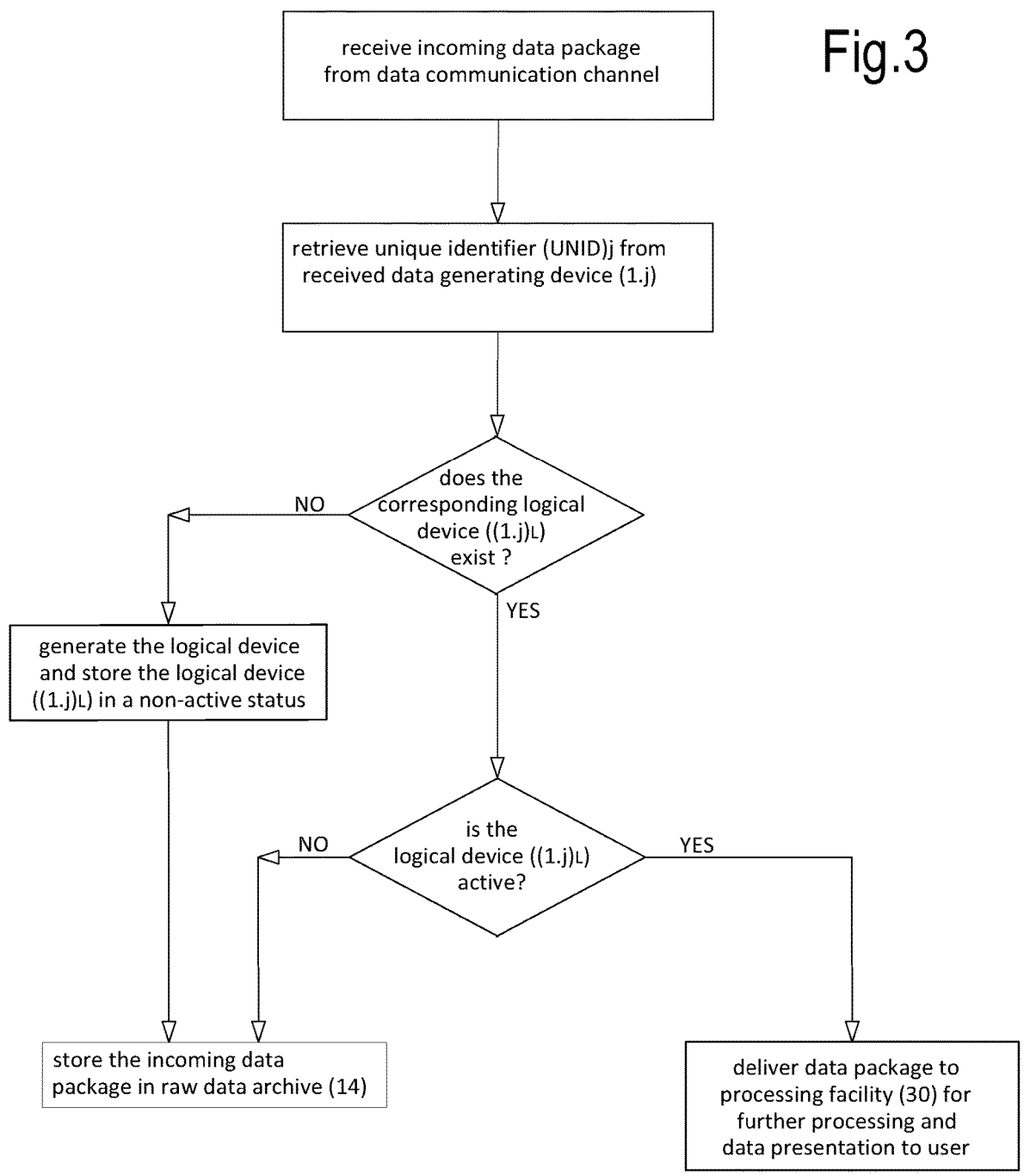

METHOD AND SYSTEM FOR DATA STREAM PROCESSING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: European Patent Application No. 17188881.1 filed on Aug. 31, 2017, entitled "Method and System for Data Stream Processing."

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

TECHNICAL FIELD

Disclosed herein are systems and methods for collecting and processing data streams from a communication network.

BACKGROUND OF THE INVENTION

Connective devices installed on field require a robust, reliable, performing and scalable communication infrastructure for collecting and processing data generated by the devices. Typically, data are transmitted from the devices through suitable telecommunication channels to a web portal. Data received by the web portal are stored and processed by the web portal prior to be made available to customers.

For instance, renewable energy plants, such as wind farms, photovoltaic installations and the like, usually are comprised of a large number of inverters which collect DC electric power generated by the renewable energy sources, such as a wind turbines or a photovoltaic panel arrays, and convert the electric power into AC electric power suitable for powering electric loads or for feeding into an electric power distribution grid. Control units of inverters collect data relating to the operation of the inverters and of the electric generator facilities connected thereto, such as wind turbines and photovoltaic panels. The collected data may be useful to monitor the inverters and other devices connected thereto and to measure parameters related to the generated AC current, e.g. active power, reactive power, power factor, voltage, etc.

Similar requirements in terms of data collecting and processing can arise e.g. in connection with UPSs, battery chargers, devices for automotive applications and the like.

Data processing must be efficient, inexpensive, easy to manage and to maintain. Also important is data storing, since incoming data have to be continuously stored through an efficient and high-bandwidth channel.

A web portal represents the main component of a communication infrastructure. A web portal must be robust, i.e. it has to be able to bear increasing loads and to quickly recover from incidents. Furthermore, the web portal must be available and performing, i.e. it always has to quickly respond to users' calls. Web portals must also be reliable, i.e. they shall ensure that data are not lost, and easily maintainable. The system complexity must be bearable, loads and costs must be under control.

Usually a very large number of devices on the field are in data communication with a web portal, where data are stored and processed. Devices can belong to several different owners. For instance, different photovoltaic installations can belong to different owners. Each owner can subscribe a service from the web portal and register his own devices to obtain digested and processed data on, for instance, the power produced by his installations, as well as information on the operating conditions, efficiency and performance of the various devices, for instance. Depending upon the kind (and cost) of the signed contract, different users may have different priorities, i.e. their requests can be processed with a higher or lower priority over requests from other users.

Data are usually collected, processed and made available to the owner only upon subscription of the service and registration of each device owned by the subscriber with the web portal. Data collected during time intervals between installation of the device(s) and subscription of the service are lost. This represents a drawback of data collection systems of the current art.

Further disadvantages of the current prior art data collecting and processing systems relate to delays due to several reasons. In some cases, there might be delays between data ingestion and data processing. For instance, there may be operative delays that characterize the process itself. Further delays may be caused by unexpected peaks of ingested data that could cause performance issues. Ordinary maintenance of portal infrastructure and/or incidents on processing systems may make processing service temporary unavailable and thus cause delays in data processing Also, devices that transmit large amount of historical data, for instance because they are recovering from communication interruptions, may be a further cause of delay in data processing.

A need therefore exists for a data collection and processing system which at least partially overcomes or alleviates at least one of the drawbacks of current art data collecting and processing systems.

In particular, it would be beneficial to provide a system, which prevents loss of data and which is capable of processing data and make them available to the owner as fast as possible. It would be further beneficial to prevent or reduce data processing delays and to process data in a near-real time fashion, i.e. with a limited delay between the time of data collection and the time when the collected data are processed and made available to the owner.

BRIEF SUMMARY OF THE INVENTION

In order to alleviate or overcome one or more of the drawbacks of the prior art data ingestion methods, a method for processing a flow of data from a plurality of devices is disclosed herein, comprising the following steps:

upon receipt of a data package from one of a plurality of devices connected to a data ingestion system or structure, detecting whether the data package relates to an active device or a non-active device; and:

if the data package relates to an active device, delivering the data to a data processing facility; and if the data package relates to a non-active device, storing the data package in a raw-data archive.

The data relating to non-active devices can thus be stored, e.g. in a raw-data archive, for subsequent retrieving, once the relevant device, wherefrom the data are received, becomes active. Loss of data is avoided. This allows, for instance, to provide complete data from devices belonging to a customer, once the customer has subscribed a data processing service, for instance. Also those data will be subsequently processed and delivered to customer, which have been collected prior to activation of the relevant device. If a device is temporarily set in the non-active status, data received therefrom are not lost, but rather stored e.g. in a raw-data storage and processed subsequently, e.g. off-line once the device is switched back in the active status.

According to some embodiments, the step of detecting whether the data package relates to an active device or a non-active device comprises the following steps:
retrieving from the data package a unique identifier of the device wherefrom the data package is received;
verifying whether a logical device exists, which represents the device wherefrom the data package is originated, and verifying if the logical device is in an active status or a non-active status.

According to some embodiments, if the logical device representing the device wherefrom the data package is originated is not available, a logical device can be generated and the logical device can be set in a non-active status.

Further features and embodiments of methods according to the present disclosure are set forth in the attached claims.

According to a further aspect, disclosed herein is a data processing infrastructure adapted to be in data communication relationship with a plurality of devices (1). The data processing infrastructure comprises an offline data stream adapted to deliver data received from said devices towards a raw-data archive. The data processing infrastructure further comprises a live data stream adapted to transmit data to a data processing facility for further processing. A storage unit is further provided, adapted to store identification data of each device in data communication with the data processing infrastructure and information on a status of each said device.

Each device in data communication relationship with the data processing infrastructure can thus be identified upon receipt of a data package and the status of the device, either an active device or a non-active device, can be identified. Depending upon the status of the device, wherefrom the data are originated, the data can be delivered to further data processing means (if the device is in an active status) or can be stored in the raw-data archive (if the device is in the non-active status), for later processing. Data from active devices are delivered towards the live data stream, while data from non-active devices are diverted to the off-line data stream and can be retrieved later on, when the device switches from non-active to active status.

Further features and embodiments of the data processing infrastructure according to the present disclosure are set forth in the appended claims.

According to yet another aspect, disclosed herein is a method for processing a flow of data from a plurality of devices, comprising the following steps:
creating a logical device for each device connected to a data processing infrastructure;
assigning a non-active or an active status to each said logical devices;
upon receipt of a data package from one of said devices:
if the logical device, corresponding to the device wherefrom the data package has been received, is in an active state, delivering the data package to a data processing facility; and
if the logical device, corresponding to the device wherefrom the data package has been received, is in a non-active state, storing the data package in a raw-data archive.

Such method can further include one or more of the features, limitations or steps of the appended dependent claims.

BRIEF DESCRIPTION OF THE SEVERAL VIEWS OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:
FIG. 1 is block diagram of an exemplary embodiment of an incoming data processing infrastructure;
FIG. 2 is a schematic representation of a data package;
FIG. 3 is a flow chart summarizing the operation of the data processing infrastructure of FIG. 1.

DETAILED DESCRIPTION OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

A new approach to data mining relying on a reliable infrastructure is disclosed. The method and structure disclosed herein allow to automatically route incoming data towards proper processing flows, by identifying in advance which is the source device, wherefrom the data are coming, and the status thereof in the system representation.

Incoming data received from physical devices on the field are routed through a balancer towards a clustered service in charge of identifying the devices that send data to the web portal and of selecting data processing flows according to the status of corresponding logical devices, i.e. system representations of the physical devices.

A logical device, i.e. the representation in the web portal system of the physical device, can take up different statuses. For instance, logical devices can be switched from an active status to a non-active status and vice-versa. Switching can be triggered by different events or factors and can take place anytime. For instance, a logical device can be switched from active to non-active and vice-versa according to a communication status of the corresponding physical device, or according to the load of simultaneously ingested data that the portal has to bear. A device can be temporarily marked as non-active in order for the portal to cope with unexpected peaks of load. A device can be marked as non-active because the corresponding physical device is not communicating with the portal.

Switching from one status to another can also be business related. For example, a logical device corresponding to a not yet registered physical device can be marked as non-active. A device belonging to an owner whose license is expired can be marked as non-active. A device can be temporarily marked as non-active in order to let the portal give processing priority to devices belonging to premium customers, i.e. to customers who have subscribed to a service providing higher priority.

A smart stream manager can be in charge of marking the logical devices as active or non-active.

According to embodiments disclosed herein, incoming data from physical devices are stored in raw format in a database, regardless of the status of the corresponding logical devices. Two data processing flows are provided: an offline data stream is provided for data belonging to non-active logical devices; a live data stream is reserved to data belonging to active logical devices.

Data assigned to the live data stream are immediately delivered to portal processing services for further processing, parsing and storing. Processed data can be presented to the customer upon request of the customer by accessing the portal.

Data assigned to the offline data stream can be stored for future processing. A service for offline data recovery is in charge of retrieving archived data that need to be processed, e.g. once a non-active logical device is switched to the active status.

The smart stream manager decides:
whether to activate or deactivate a logical device, i.e. to switch it into an active or non-active status;
which devices are to be given a higher priority in the data recovery process (e.g. devices belonging to premium customers might benefit from a higher processing priority; some devices might be temporarily given a lower processing priority to decrease service processing loads);
which recovery policy has to be applied to data to be processed by the data recovery service, e.g.
process older data records first (past-to-present mode),
process new data records first (present-to-past mode),
process sample data in the whole processing period then progressively fill-up processing gaps (low-to-high resolution mode).

Referring now to FIG. 1, an exemplary embodiment of a data communication and processing infrastructure according to the present disclosure will be described.

The data processing infrastructure described herein can be in data communication relationship with a plurality of electronic devices on the field. In FIG. 1 reference numbers 1.1, . . . 1.$i$, . . . 1.$n$ schematically represent a plurality of generic electronic devices on the field. The electronic devices can be identical or similar to one another or different from one another. For instance, each electronic device can be a microcontroller of an inverter, for example an inverter electrically coupled to a photovoltaic panel or panel array, to an electric generator powered by a wind or hydraulic turbine, or to another electric power source. Electronic devices 1 can also include one or more transducers adapted to detect one or more environmental parameters, such as temperature, wind speed, solar irradiation, humidity, etc. In some embodiments, electronic devices 1 may include a cluster of components and elements, such as an inverter, one or more sensors, probes or transducers, micro-controllers and data transmission facilities.

Each electronic device 1 can be provided with a data logger 3. The data loggers of devices 1.1, . . . 1.$i$, . . . 1.$n$ are labeled 3.1, . . . 3.$i$, . . . 3.$n$ in FIG. 1.

The devices can be connected to a data processing infrastructure 7, e.g. through an HTTP or HTTPS protocol connection 5 through the internet, or through any other internet or IoT (Internet of Things) protocol.

The devices 1 can belong to one or more aggregates of devices, for instance one or more photovoltaic installations, wind farms, and the like. Generally speaking, the data processing infrastructure 7 can be in data communication relationship with several device aggregates, which can belong to different owners and can be located anywhere in the world, provided a data communication channel can be established between the device aggregate and the data processing infrastructure 7. The data processing infrastructure 7 can be a portion of a web portal 8.

In general, during manufacturing, each device 1 is assigned a unique identifier (UNID), e.g. a univocal serial number, for univocal identification thereof. The unique identifiers of all produced devices, which are to be connected to a web portal 8, are sent to the web portal 8 and stored thereby. In this way, each device 1 that will be placed in data communication relationship with the web portal 8 can be identified by the web portal. When a device 1 is installed on the field and switched on, the device starts data communication with the web portal. Thanks to the UNID assigned to each communicating device, the web portal univocally identifies each device 1 as soon as data communication therewith starts.

For each physical device 1 connected to the web portal 8, a logical device is generated. A logical device is a representation, within the web portal, of the physical device. According to some embodiments, each logical device can take at least two different statuses, namely an active status and a non-active status. In some embodiments, upon generation thereof, each logical device takes on a non-active status by default. The status is switched to active when a given condition is satisfied, e.g. upon subscription and activation of a service by the customer.

Each physical device 1 can belong to one of several owners. For instance, a first set of photovoltaic inverters can be part of a first photovoltaic installation and belong to a first owner (owner OA). A second set of photovoltaic inverters can be part of a second photovoltaic installation and belong to a second owner (owner OB). Upon installation, each device 1 can start data communication with the web portal 8 and this latter can generate a logical device for each physical device. The initial status of such logical devices will be a non-active status. The status of a logical device can be switched from the non-active status to the active status as soon as the owner thereof subscribes a service contract with the web portal 8 and registers the corresponding physical device belonging to him by communicating the relevant UNIDs to the web portal 8. Once the device owner has subscribed the web portal service and registered the physical devices 1 belonging to him, the respective logical devices will switch from the non-active to the active status and the owner will be able to access the data relating to his devices.

Each logical device then may be deactivated and reactivated anytime, i.e. it can be switched from an active status to a non-active status, and vice-versa, for instance for the reasons set forth above.

According to embodiments disclosed herein, incoming data from physical devices 1 are stored in the web portal 8, regardless of the status of the corresponding logical device, such that the user will be able to retrieve the data belonging to his set of devices 1 upon registration and will be able to get access also to those data which have been collected meanwhile, between the time when the physical devices 1 start communication with the web portal 8 and the time of activation of the devices. Additionally, data are stored, and can be retrieved later, also when a previously "active" device is temporarily switched in the non-active status.

According to some embodiments, the data processing infrastructure 7 of the web portal 8 can comprise a data balancer 9. As understood herein, a data balancer can be any service, preferably a scalable service, which distributes the incoming workload through a plurality of resources available in the data processing infrastructure 7.

The data balancer 9 can be in data communication relationship with a data service 11. The data service 11 can be a scalable service connected to a smart stream manager 10 in charge of deciding if a device is active or non-active, thus assigning its data to one or the other of two data streams. These two data streams are referred to herein as a "live data stream 13" and an "offline data stream 15".

In the schematic of FIG. 1, the live data stream 13 contains live data, which are moved forward to a next processing stage as represented by arrow 17 across the web portal 8. In some embodiments the data of the live data stream 13 can be stored also as raw data in a raw-data archive 14. Block 12 represents a raw-data archiving service. Live data are those data which are transmitted by physical devices 1, the corresponding logical devices whereof are in the active status. Thus, the live data stream 13 receives data originating from devices 1 whose corresponding logical device are in the "active status".

The offline data stream 15 collects those data, which are received from physical devices 1, whose corresponding logical devices are in a "non-active" status. The data of the offline data stream 15 are stored through the raw-data archiving service 12 as raw data in the raw-data archive 14 and are not forwarded to the next data processing steps through portal 8, until the respective logical device is switched into the active status.

The raw-data archive 14 can receive and permanently store incoming data in a raw form, i.e. prior to further processing for further forwarding to customers, for instance. Data from non-active devices 1 are stored in the raw-data archive 14, and will be retrieve from the raw-data archive at a later stage when the relevant device 1 will be switched from the non-active to the active status.

The data processing infrastructure 7 can comprise a storage unit, or can be in data communication with a storage unit, which contains data on logical device, each of which represent or corresponds to a device 1 in data-communication relationship with the data processing infrastructure 7. In FIG. 1 a storage unit is schematically shown at 19. The storage unit 19 will be referred to herein also as logical device database 14. The unique identifiers UNID of each physical device $1.j$, which is in data communication with the data processing infrastructure 7, is stored in the logical device database 19 and can be associated with the logical device $(1.j)L$ corresponding to the physical device $1.j$. In FIG. 1 the logical device database 19 contains unique identifiers (UNID)j of each logical device $(1.j)L$ associated to the corresponding physical device $1.j$, which has been registered with web portal 8, and/or which is or has been in data communication therewith.

Each user or owner of a physical device $1.j$ can register with the web portal 8 the unique identifier UNIDj of his physical device $1.j$, such that the unique identifier UNIDj is stored in the logical device database 19 in association with the logical device $(1.j)L$ corresponding to the physical device $1.j$. Registration can be conditional upon subscription of a web portal service and registration can be time-limited, such that the unique identifier (UNID)j of a given device $1.j$ will be deleted from the logical device database 19, or its status can be switched to "non-active" upon expiry of the subscribed service, unless the subscription is renewed. I.e. the owner of the device $1.j$, wishing to access data from the device through the web portal 8, is required to subscribe a web portal service, which may require the payment of a relevant fee and/or providing user's data. He is also required to identify which devices 1 are intended to be covered by the subscribed service. The user can do so by providing the relevant unique identifiers (UNID) of each such device, i.e. by registering the device with the web portal 8.

Once a service has been subscribed and a device $1.j$ has been registered, the smart stream manager can switch the status (STATUS)j of the corresponding logical device $(1.j)L$ to "active".

The data service 11 can collect information on the logical devices through the smart stream manager 10. This latter can be functionally coupled to the database 19 and to a device-information database 16, which stores information on the physical devices, such as owner data, service expiration, priority policy, recovery policy, etc.

Incoming data from the physical devices 1 can be time-stamped and can be identified by the unique identifier (UNID)j corresponding to the physical device $1.j$, wherefrom the data are transmitted. For instance, a data package 100 (FIG. 2) received by the data service 11 may have a header 102 containing the unique identifier UNID and a time stamp, followed by a payload 104 containing the actual data to be collected and processed by the web portal 8. A checksum CRC can be provided at the end of the data package 100.

For each incoming data package, the data service 11 can check, through the smart stream manager 10, whether a corresponding logical device $(1.j)L$ associated with the unique identifier (UNID)j contained in the data package is already present in the web portal 8. This can be done e.g. by checking the logical device database 19. In some embodiments, if data from device $1.j$ have been received by the data service 11 prior to subscription by the user, the device unique identifier (UNID)j and relevant logical device $(1.j)L$ can be already in the logical device database 19.

If the logical device $(1.j)L$ has not been generated yet, the logical device $(1.j)L$ is generated and stored along with the unique identifier (UNID)j thereof in the logical device database 19. A "non-active" status [(STATUS)j="non-active"] is given by the smart stream manager 10 to the logical device $(1.j)L$.

If, upon receipt of data from the physical device $1.j$, the corresponding logical device $(1.j)L$ is already present in the web portal 8, e.g. already stored in the logical device database 19, the status thereof can be checked. As noted above, the status of a logical device $(1.j)L$ can be either active or non-active, according to the aforementioned policy.

For example, subscription of a web service by the user and registration of the device can cause the status of the relevant logical device $(1.j)L$ already present in the logical device database 19 to switch from "non-active" to "active". If at the time of subscription no data have been received from the device $1.j$ yet, registration by the user can result in a logical device (1.j)L be generated and stored in association with its unique identifier (UNID)j. The status of the logical device (1.j)L can be set to "active".

If upon receipt of a data package from physical device 1.j the corresponding logical device (1.j)L is in the active status, the data are processed further through the live data stream 13 and possibly stored in the raw-data storage 14. If the logical device (1.j)L is in the "non-active" status, the data are delivered through offline data stream 15 to the raw-data storage 14, stored therein, and not processed further, until the corresponding logical device is switched to the active status.

If the logical device (1.j)L is not present, a logical device (1.j)L is generated, the status thereof is set to "non-active" and stored along with the unique identifier (UNID)j, and the data are stored in the raw-data storage 14.

The process thus described ensures that all data received by the data processing infrastructure 7 are stored, including those of non-active, or not yet registered devices 1, such that said data can be retrieved at a later stage, once the respective logical device is switched in the "active" status.

As shown in the functional block diagram of FIG. 1, according to embodiments disclosed herein, the data processing infrastructure 7 can include an off-line data recovery functional block 21, which can be functionally coupled to the raw-data archive 14, to the smart stream manager 10 and to the live data stream 13.

Once a previously off-line logical device (1.j)L, i.e. a logical device in the "non-active" status, is switched to the "active" status, e.g. following subscription of a web service by the respective user, the off-line data recovery functional block 21 can retrieve the relevant data stored in the off-line raw-data storage 14 and add them in the live data stream 13 for further processing. Data retrieving from the raw-data storage 14 can be performed in background according to the aforementioned data recovery policy, without adversely affecting the processing of live data, under the control of the smart stream manager 10, for instance.

The web portal 8 can include a data processing facility 30, which may be comprised of one or more processing and storing units or facilities. The structure of the data processing facility 30 is not relevant to the present disclosure and will therefore not be described in detail. The processing facility 30 can process the data and made them available users through the internet or through any other suitable communication channel, as schematically shown in FIG. 1.

FIG. 3 shows a flow chart summarizing the method performed by data processing infrastructure 7 described above. The background retrieving of data is not shown in FIG. 3.

The above described structure and method of data handling, provides several advantages. They ensure data from devices 1 on the field are collected and stored from the very beginning, i.e. as soon as data are received by the data processing infrastructure 7. No data are lost and all data can be recovered following the aforementioned logical device activation/deactivation and the data recovery policies.

The storing capabilities made available along the processing chain ensure no data loss even if a service on the chain is completely down. System maintenance is then made easier and safer.

The capability of recovering offline data only when necessary avoids overloading the system when not required, so it does not have to be over dimensioned. Moreover, when a non-active device is activated, live data coming from the device are processed immediately, while historical data are recovered and processed in background, showing to the final user a highly performing data-processing.

The described approach works effectively also if data are, for some reason, intermittently received. This may occur for instance if some devices 1 suffer for communication faults because of an unstable network on field.

Efficiency of the system is maintained also if the data are received with different granularity, e.g. because the sampling interval configuration has changed, or if data are or not ordered according to the timestamp, e.g. if data are backfilled. In all the cases, data are processed as soon as they are received or recovered from the raw archive 14.

Thus, although there have been described particular embodiments of the present invention of a new and useful it is not intended that such references be construed as limitations upon the scope of this invention except as set forth in the following claims.

What is claimed is:

1. A method for processing a flow of data from a plurality of devices, the method comprising the following steps:
   receiving data packages from a plurality of devices at a data balancer;
   distributing the received data packages to a data service;
   detecting whether said data package relates to an active device or a non-active device;
   generating, through said data service a live data stream, consisting of data from active devices, said live data stream being delivered to a data processing facility;
   generating, through said data service an offline data stream, consisting of data from non-active devices, which is delivered to the raw-data archive and stored therein; and
   when a non-active device is switched to the active status, retrieving in the background data packages relating to said switched device from the raw-data archive, introducing the retrieved data in the live data stream, and delivering said retrieved data to the data processing facility.

2. The method of claim 1, wherein the step of detecting whether the data package relates to an active device or a non-active device comprises the following steps:
   retrieving from the data package a unique identifier of the device wherefrom the data package is received;
   verifying whether a logical device exists, which represents the device wherefrom the data package is originated, and verifying if the logical device is in an active status or a non-active status.

3. The method of claim 2, further comprising the following step:
   if the logical device representing the device wherefrom the data package is originated, is not available, generating the logical device and setting the logical device in a non-active status.

4. The method of claim 1, further comprising the following steps:
   switching a non-active device, or the logical device corresponding thereto, from the non-active status to an active status upon occurrence of an activating condition;
   retrieving from the raw-data archive data relating to the switched device and further delivering the data to the data processing facility.

5. The method of claim 4, wherein the occurrence of an activation condition comprises subscription of a service by a user and registering the device by the user.

6. The method of claim 1, comprising the step of storing the data package from an active device in the raw-data archive.

7. The method of claim 1, wherein
said live data stream is also to said raw-data archive.

8. The method of claim 1, further comprising the step of storing information on said devices in a device-information database.

9. The method of claim 8, further comprising the step of using information from said device-information database to selectively switch a device or the logical device corresponding thereto, from an active status to a non-active status or vice-versa.

10. A data processing infrastructure adapted to be in data communication relationship with a plurality of devices, comprising:
- an offline data stream adapted to deliver data received from said devices towards a raw-data archive;
- a live data stream adapted to transmit data to a data processing facility for further processing;
- a storage unit adapted to store identification data of each device in data communication with the data processing infrastructure and information on a status of each said device; and
- an off-line data recovery functional block, functionally linked to the raw-data archive and to the live data stream, and adapted to recover data from the raw-data archive in the background and deliver said data to the live data stream depending on the status of the devices, wherefrom said data have been originated.

11. The data processing infrastructure of claim 10, wherein the storage unit is adapted to store each said identification data of each device in an associated manner with a data identifying a corresponding logical device and with further data on the status of said device or of the logical device corresponding thereto.

12. The data processing infrastructure of claim 11, further comprising a device-information database adapted to store information on each said device.

13. The data processing infrastructure of claim 12, further comprising a smart stream manager, adapted to switch a device or the logical device corresponding thereto in an active status or non-active status.

14. The data processing infrastructure of claim 10, further comprising a device-information database adapted to store information on each said device.

15. The data processing infrastructure of claim 10, wherein the off-line data recovery functional block is adapted to recover from said raw-data archive data originated from each said non-active device when said non-active device is switched from the non-active status to the active status.

16. The data processing infrastructure of claim 10, further comprising a smart stream manager, adapted to switch a device or the logical device corresponding thereto in an active status or non-active status.

17. The data processing infrastructure of claim 16, wherein the smart stream manager is adapted to detect whether a device, or the logical device corresponding thereto, wherefrom an incoming data package is received by the data processing structure is in an active status or in a non-active status, and to convey the incoming data package to the offline data stream or to the live data stream according to the detected device status.

* * * * *